Dec. 17, 1957     R. V. GANZ     2,816,347

METHOD OF MAKING CERAMIC FORMS

Filed Feb. 21, 1956

*INVENTOR.*
RUDOLPH V. GANZ

BY *Willis F. Avery*

ATTORNEY

United States Patent Office 2,816,347
Patented Dec. 17, 1957

2,816,347

METHOD OF MAKING CERAMIC FORMS

Rudolph V. Ganz, Cuyahoga Falls, Ohio

Application February 21, 1956, Serial No. 567,012

10 Claims. (Cl. 25—156)

The present invention relates to the manufacture of a ceramic form of a character employed in the production of thin rubber and plastic articles by dipping the form into a liquid dispersion of rubber or other plastic, whether an organosol or a plastisol, and particularly to a method of making a hollow porcelain dipping form having patterns or designs, whether ornamental or utilitarian, depressed or debossed into the surface of the dipping form in certain limited areas only, while leaving the remaining surfaces of the dipping form smooth and devoid of debossed markings.

Ceramic or porcelain hollow dipping forms have heretofore been made by filling a hollow solid porous mold with a clay slip or slurry in liquid form, the mold being highly pervious to water so that water in the clay slurry contacting the inner surface of the mold is readily absorbed into the interstices or pores of the water-absorbent solid mold, thus building up a self-sustaining layer of clay contiguous to the inner surface of the mold. The longer the clay slurry is within the pervious water-absorbent mold, the greater the thickness of the self-sustaining clay layer deposited on the inner surface of the mold. When the self-sustaining clay layer has attained a desired thickness, the surplus liquid clay slurry is poured out of the mold leaving the self-sustaining clay layer within the mold, which is removed, baked and becomes the ceramic dipping form.

The porous water-absorbent mold is normally constructed in two or more sections, so that the mold may be removed from the self-sustaining clay layer, which constitutes the dipping form, without distorting the latter. The green dipping form is allowed to dry, commonly given a glazing coating, and then baked in an oven to produce a hard firm smooth-surfaced dipping form. In the trade, a dipping form made in the above-described manner is said to be cast in the mold, and the end product to be a hollow cast ceramic dipping form.

An object of the present invention is to make a hollow cast ceramic dipping form of the general type hereinabove described in which certain specific surface area or areas of the dipping form are debossed with designs in such manner as to impart a utilitarian or ornamental surface design, to those specific surface areas, and so as to give to the dipped article made on the said cast ceramic dipping form a greater thickness and strength at the areas of the article which carry the design, and thus to produce a superior product. Thus, in connection with a hollow cast ceramic glove dipping form, the design debossed areas may comprise intaglio non-slip designs, or trade or name mark designs, so as to produce a raised or relief design on the articles made with the dipping forms.

In the drawings, one embodiment of the invention of this application is illustrated. It is to be understood, however, that the invention is not limited to the making of any particular type of hollow cast ceramic forms but is of general application.

Figure 1:
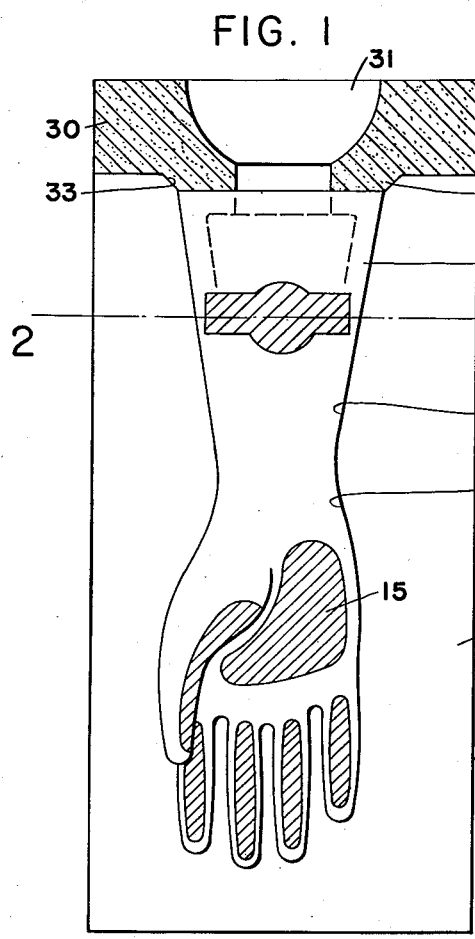
Fig. 1 is a front elevation of one of the mold sections of a multi-section pervious plaster mold, looking into the mold cavity in which have been placed the design members.
Figure 3:
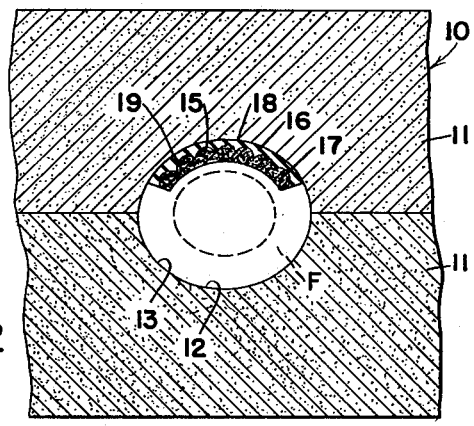
Fig. 3 is an enlarged sectional view of a finger portion of the pervious mold, the design member being adhered in position on the inner surface of a finger portion of the pervious mold.

I have discovered that a molded plastic sheet can be provided with surfaces that embody a wide and almost limitless variety of designs, both utilitarian and ornamental. However, since a plastic design sheet is impervious to water and hence when a sheet plastic design is applied to the pervious mold in which the dipping form is to be cast, the self-sustaining clay layer will not build up behind the rubber design sheet to a sufficient thickness, such a sheet plastic design has not heretofore been practical.

I have overcome this difficulty in the use of sheet plastic designs by preforming a design member that consists of two elements: a ceramic backing element and a surface debossing element comprising a sheet plastic design having one side smooth and preferably shaped to fit snugly to that portion of the pervious casting mold to which it is to be attached, and the other side of the plastic sheet contiguous the ceramic backing element having the design desired to be imparted to the finished ceramic dipping form, such as a debossed or intaglio non-slip design or name design.

In carrying out the invention of this application, I utilize a highly air- and water-pervious and water absorbent mold 10 of the character hereinabove described, which mold is made in a plurality of sections 11 so shaped and fitted together as to provide a mold cavity 12 of a size and shape and having an inner surface 13 suitable for casting the desired ceramic form. The mold sections 11 are designed so as to make the inner surface 13 of the mold cavity readily accessible, when the sections are separated, for the attachment to the inner surface 13 of the mold 10 of the design members 15, hereinafter more fully described.

A design member 15 consists of two members: a flexible plastic sheet element 16 and a ceramic backing element 17, the design member being preformed in any manner and being of a size and shape to fit snugly to that portion of the inner surface 13 of the mold 10 in the areas in which it is desired to produce a debossed design in the ceramic dipping form.

The flexible sheet element 16, which is preferably of vulcanized rubber but may be made of other suitable plastic materials, is smooth on one side 18 and contains a molded patteren 19 on the other side. The ceramic backing element 17 is formed in contact with the molded pattern 19 of the flexible sheet 16, and is made of a thickness somewhat less than that of the thickness of the wall of ceramic dipping form F of which it is to form a part.

Figure 4:
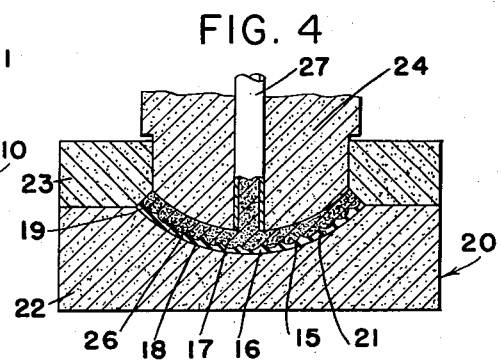
Fig. 4 is a cross-sectional view of a preforming mold with the design member in place, illustrating one of the ways in which the preformed design members are made.

One method of preforming the design member 15 is illustrated in Fig. 4 of the drawings. A separate and independent preforming mold 20 of an air- and water-pervious water-absorbent solid, such as plaster of Paris, is provided with a molding surface 21 having a contour matching the contour of that portion of the inner surface 13 of mold 10 to which the design is to be attached. As shown, the preforming mold 20 is made in three sections: a base section 22, a cover section 23, and a plunger section 24, movable in the cover section 23, but obviously other forms of sectional mold structure may be employed in the making of the preformed design member 15.

The smooth side 18 of the plastic sheet material 16 is fitted to the surface 21 of mold 20 and may be temporarily held in place by wetting the smooth side 18 with water or a liquid which will cause the sheet 16 to fit snugly to the surface 21 of the mold 20. The remaining sections of the mold 23 and 24, which are highly water-absorbent, are assembled to form a chamber 26 having the shape of the design member 15. The chamber 26 is filled with a clay slip, which may be placed in chamber 26 before the mold is closed. Thus, the section 23 may be put in place and the clay slip poured into the assembled sections through the opening into which section 24 fits. Then, with the placing of section 24 in place, any excess clay slip may be carried away through channel 27, preferably comprising a conduit of water-impervious material. Alternatively, the clay slip may be introduced through channel 27, and a slight pressure maintained on the clay slurry within the channel 27 during the molding operation.

The mold sections 23 and 24 are highly pervious to air and to water, so that there is no danger of air pocketing within the ceramic backing element 17, or behind the element 18, during the formation of the design element 15. The water in the clay slip within chamber 26 is absorbed into the mold sections 23, 24 and thus becomes a self-sustaining layer of clay over the sheet plastic design 16. It is desirable to keep a supply of the clay slip within the channel 27 during casting so as to keep the chamber 26 filled at all times. Since the channel 27 is impervious, the clay slip in the channel will not solidify as does the clay slip in chamber 26. The design member 15 is removed from the mold 20, trimmed if necessary, and allowed to dry so that it will attain greater rigidity, and the ceramic backing element 17 will become water-absorbent to a certain degree.

The design members 15, preformed as described above, are placed on the inner surface 13 of the highly air- and water-pervious casting mold 10, and are adhered, each in its proper place, by wetting the contacting surfaces 18 of the plastic elements 16 with the clay slip or with other relatively weak adhesive adequate to hold the members 15 in place during the pouring of the clay slurry into the cavity 12 of the casting mold 10.

The casting mold 10 has an end section 30 having an opening 31 through which the clay slurry is poured so as to fill the casting mold cavity 12. As shown in Fig. 1, the end section 30 has a protruding collar 32 which fits into a recess 33 in the casting mold 10. The clay slurry should fill the cavity 12 and should be allowed to remain within the cavity 12 until a self-sustaining layer of the clay has been formed contiguous to the pervious walls of the cavity 12.

Figure 2:
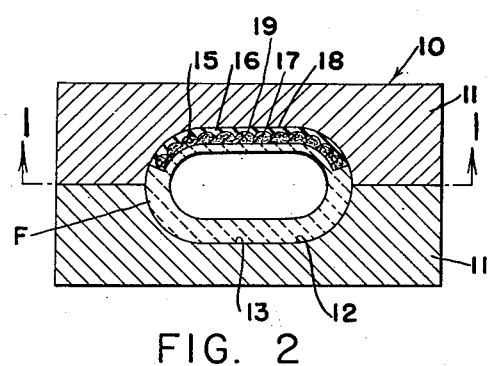
Fig. 2 is a cross-sectional view of the pervious plaster mold on line 2—2 of Fig. 1, when the mold is closed, with the clay form deposited on the inner surface of the pervious mold.
Figure 5:
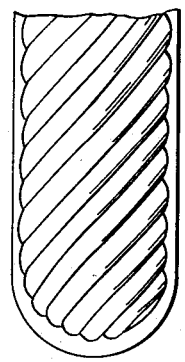
Fig. 5 is an enlarged front elevation of a finger portion of the finished cast ceramic form, illustrating one type of non-slip surface.

In the areas of the pervious wall covered by the design members 15, the self-sustaining layer of clay does not form to the thickness that it forms contiguous the areas of walls not covered by the design members, but a thinner layer does form over the design members 15, so that the design members 15 are embedded in the self-sustaining layer and form an integral part of the dipping form, as indicated in Fig. 2, in such manner that the wall structure of the dipping form in the areas of the design member is substantially the same thickness as the wall structure in other areas, although uniform thickness is not material.

When the surplus clay slip has been poured out of the mold 10 and the self-sustaining layer has been allowed to dry and set, the mold sections 11 and 30 are removed from the cast clay dipping form F and the latter is trimmed and finished, if needed, and allowed to dry out in order to give the dipping form F greater rigidity. The cast clay form F may be then coated on its outer surface with a glazing liquid composition, which on baking the cast clay form gives to it a smooth, glossy, and impervious surface.

Normally, the plastic sheet design element 16 adheres to the cast clay dipping form F and is removed before the baking operation, particularly when it is desired again to use the flexible plastic sheet patch 16 in subsequent operations. However, where it is desired to have the design portion of the dipping form unglazed, the form may be first coated with the glazing liquid and then the sheet design element 16 removed, leaving the design areas without a glazing coating. Generally, as indicated above, the sheet design elements 16 are removed from the cast clay dipping form before glazing, and the design areas masked, as by coating with latex, paraffin or other masking material, and after glazing, but before baking, the masking peeled off or otherwise removed, or, in case of a paraffin mask, the mask need not be removed but will be burned off during the baking of the dipping form F.

The last step in the manufacture of the cast ceramic dipping form is the firing operation, or baking in an oven or kiln, to convert the clay into a hard, firm and strong ceramic solid and to convert the surface glazing coating into a smooth, hard, glossy surface layer on the finished ceramic form.

When the cast ceramic form F is dipped into a liquid dispersion of rubber or other plastic, whether an organosol or a plastisol, the plastic deposited on the glazed regions of the surface of the form will have a sheen or luster when the dipped article is removed from the form, and the plastic deposited on the unglazed areas of the surface of the dipping form will have, when stripped from the form, a roughened or figured area comprising a raised design complementary to the intaglio design of the element 17. As is the practice in all dipping operations, where articles are produced by dipping into a plastic dispersion, the article after setting or drying on the dipping form, is turned inside out, so that the finished surface with its design will constitute the outer or exposed surface of the plastic article.

It will be noted that the cast ceramic form F has the design areas debossed with an intaglio design and generally depressed, or disposed at a level within that of the continuation of the surfaces of the form not debossed or depressed by the design. As a consequence, when the finished ceramic dipping form is immersed in a liquid dispersion of rubber or other plastic and the dipping form withdrawn from the liquid dispersion to form an article thereon, those parts of the article, the surfaces of which bear the design, are raised and thicker than other parts of the article, and hence the surface designed areas are reenforced, and the article, such as a glove, made more serviceable because of such raised and reenforced surface designed areas.

While the above-described invention has been illustrated in connection with the manufacture of a hollow cast ceramic glove form, it is to be understood that the method of manufacturing forms herein disclosed is equally applicable to the manufacture of dipping forms for bathing caps, balloons, and other thin-walled plastic articles, as well as to the manufacture of decorated porcelain and ceramic ware.

The invention of this application is not necessarily limited to the specific disclosure hereof, but numerous variations and modifications of the means herein disclosed may be made without departing from the spirit and scope of this invention as set forth in the appended claims.

What is claimed is:

1. The method of manufacturing a cast ceramic dipping form in the mold cavity of a mold having air- and water-pervious walls which comprises preforming a design member having a flexible plastic sheet facing element and a ceramic sheet backing element, the facing element being relatively smooth on one side and having an embossed design on the other side, the backing element being molded on one side against the embossed side of the facing element and having its opposite side relatively smooth and in generally parallel relation to the smooth side of the facing element, securing the design member to the inner molding surface of the mold with the smooth surface of the facing element in adhesive contact with the said inner surface, closing the mold, filling the mold cavity with a clay slurry and retaining the slurry in the mold cavity until the absorption of water from the slurry contiguous the inner surface of the mold has caused a self-sustaining clay layer to be deposited on the inner surface of the mold and to embed the design member within the self-sustaining clay layer, withdrawing from within the mold cavity the remaining liquid clay slurry so as to produce a hollow cast clay form, removing the hollow cast clay form from the mold, and baking the hollow cast clay form to convert it to a serviceable ceramic product.

2. The method recited in claim 1, in which the design member is so shaped that the smooth surface of its facing element conforms to the shape of that part of the inner surface of the mold to which the design member is adhered.

3. The method recited in claim 1, in which the hollow cast clay form upon removal from the mold is coated on its outer surface with a liquid glazing composition.

4. The method recited in claim 1, in which following the removal of the hollow cast clay form from the mold the facing element of the design member is separated from the outer surface of the hollow clay form to expose a debossed area with intaglio design on the outer surface of the hollow cast clay form.

5. The method recited in claim 1, in which following the removal of the hollow cast clay form from the mold the facing element of the design member is separated from the outer surface of the hollow clay form to expose a debossed area with intaglio design on the outer surface of the hollow cast clay form and thereafter masking the debossed area with a surface covering and coating the outer surface of the mold with a liquid glazing composition.

6. The method of manufacturing a cast ceramic glove dipping form in the mold cavity of a mold having air- and water-pervious walls which comprises preforming design members of a number, size and shape corresponding to the normal gripping areas of a glove, each said design member having a flexible plastic sheet facing element and a ceramic backing element, the facing element being relatively smooth on one side and having an embossed design on the other side, the backing element being molded on one side against the embossed side of the facing element and having its opposite side relatively smooth and in generally parallel relation to the smooth side of the facing element, securing the several design members to the inner molding surface of the mold in the areas for which each of said design members was made with the smooth surface of the facing elements in adhesive contact with said inner molding surface, closing the mold, filling the mold cavity with a clay slurry and retaining the slurry in the mold cavity until the absorption of water from the slurry contiguous the inner surface of the mold has caused a self-sustaining clay layer to be deposited on the inner surface of the mold and to embed the design member within the self-sustaining clay layer, withdrawing from within the mold cavity the remaining liquid clay slurry so as to produce a hollow cast clay form, removing the hollow cast clay form from the mold, and baking the hollow cast clay form to convert it to a serviceable cast ceramic glove form.

7. The method of manufacturing cast ceramic glove forms defined in claim 6 in which the hollow cast clay form upon removal from the mold is coated on its outer surface with a liquid glazing composition.

8. The method of manufacturing cast ceramic glove forms defined in claim 6 in which following the removal of the hollow cast clay form from the mold the facing element of each of the design members is separated from the outer surface of the hollow cast clay form to expose the debossed areas with intaglio designs.

9. The method of manufacturing cast ceramic glove forms defined in claim 6 in which following the removal of the hollow cast clay form from the mold the facing element of each of the design members is separated from the outer surface of the hollow cast clay form to expose the debossed areas with intaglio designs and thereafter masking the debossed areas with a surface covering and coating the outer surface of the mold with a liquid glazing composition.

10. The method of manufacturing cast ceramic glove forms defined in claim 9 in which the masking surface coverings are removed before baking.

References Cited in the file of this patent
UNITED STATES PATENTS

| | | |
|---|---|---|
| 1,867,881 | Crockett | July 19, 1932 |
| 2,581,248 | Ganz | Jan. 1, 1952 |